B. L. BOBROFF.
VEHICLE SIGNAL APPARATUS.
APPLICATION FILED AUG. 28, 1915.
1,195,180.
Patented Aug. 22, 1916.
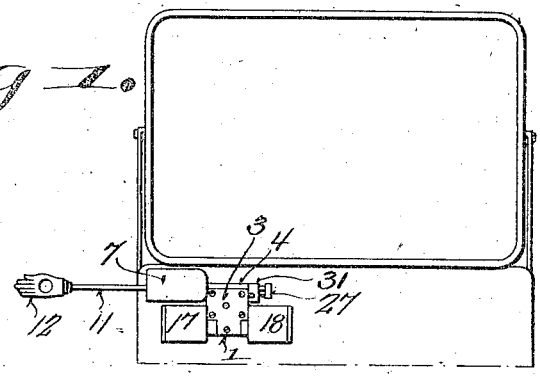
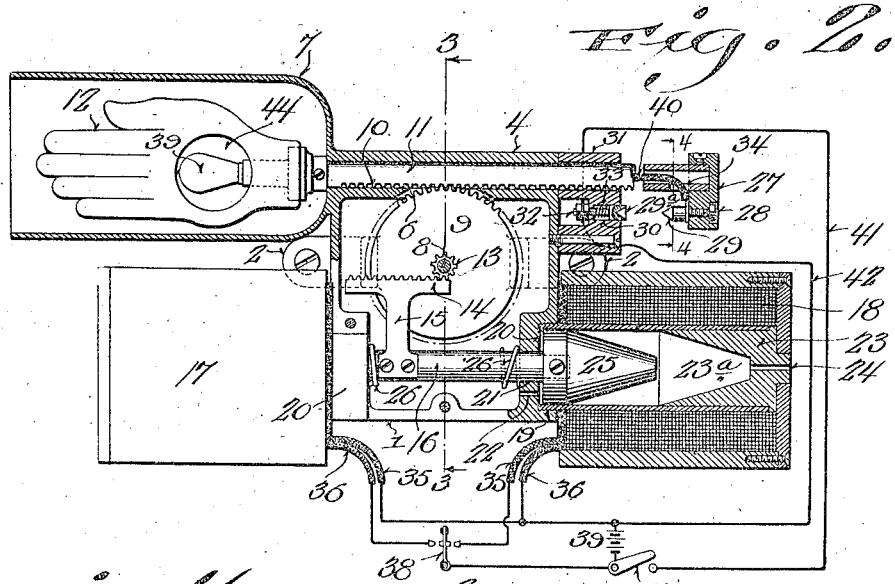
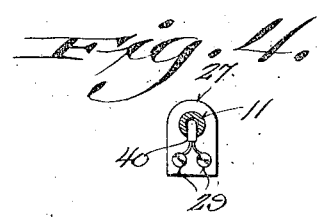
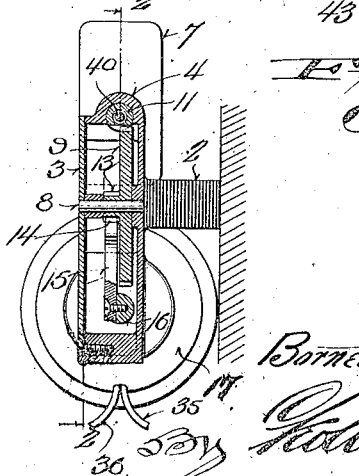

UNITED STATES PATENT OFFICE.

BORNETT L. BOBROFF, OF MILWAUKEE, WISCONSIN.

VEHICLE SIGNAL APPARATUS.

1,195,180.  Specification of Letters Patent.  Patented Aug. 22, 1916.

Application filed August 28, 1915. Serial No. 47,813.

*To all whom it may concern:*

Be it known that I, BORNETT L. BOBROFF, a citizen of the United States, and resident of Milwaukee, in the county of Milwaukee and State of Wisconsin, have invented certain new and useful Improvements in Vehicle Signal Apparatus; and I do hereby declare that the following is a full, clear, and exact description thereof.

This invention relates to the subject of signaling apparatus for vehicles, and has special relation to signaling apparatus of the type that are applied to vehicles for indicating the direction of travel of the vehicle.

The primary aim of the invention is to produce a signaling apparatus that may be carried by the front or dash of a vehicle and operated from within the vehicle to project the signal outward relative to the vehicle to indicate the direction of travel, means being provided whereby the signal may be illuminated, and means also be provided whereby the projecting and retracting movements of the signal are cushioned against shocks and jars incidental to such movements.

A simple and thoroughly practical embodiment of the invention is shown in the accompanying drawings, wherein—

Figure 1 is a view in front elevation of a motor vehicle equipped with the improved signal. Fig. 2 is a vertical sectional view taken on the line 2—2, Fig. 3. Fig. 3 is a vertical sectional view taken on the line 3—3, Fig. 2. Fig. 4 is a detail transverse sectional view taken on the line 4—4, Fig. 2.

Referring to the accompanying drawings by numerals, 1 designates a casing having rearwardly projecting supporting arms 2 adapted to be suitably attached to the dashboard of a vehicle. The casing is provided with a removable front plate 3 and has its top shaped to provide a guiding channel 4 that extends the full length of said top, the bottom central portion of the channel 4 being provided with a slot 6 that communicates with the interior of the casing 1. At one end, an enlarged housing 7 is carried by the channel 4, said casing or housing 7 being open at its outer end. A shaft 8 extends transversely across the casing 1 and has a gear 9 fast thereon that extends into the channel 4 through the slot 6 and engages the rack 10 of a signal arm 11 that is slidable in the channel 4. The arm 11 extends into the housing 7 and carries a signal 12 preferably in the form of a hand.

The hub of the gear 9 is preferably in the form of a pinion 13 that is in mesh with the rack 14 carried by an arm 15 projecting from the core 16 of a pair of magnets 17 and 18. The magnets 17 and 18 are of the solenoid type, and have threaded engagements 19 with the recesses 20 formed in opposite sides of the base portion of the casing 1. The base walls of the recesses 20 are provided with openings 21 through which the core 16 of the magnets 17 and 18 is slidable, and said walls are also provided with vent openings 22. The central chambers of the magnets have a cushioning plug 23 in their outer ends, the plugs being each provided with a conical recess $23^a$ the inner end of which is in communication with a vent passage 24. Within the chambers of the magnets, the core carries heads 25 which are preferably removable, the heads 25 being of the same shape as the recesses $23^a$. Cushions 26, which may be in the form of springs, are carried by the core and disposed so that they will prevent the arm 15 coming into forcible contact with the walls of recesses $23^a$.

The arm 11 is hollow and carries a removable head 27. The head 27 is provided with binding posts 28 having forwardly projecting conical plugs 29 adapted to engage conical sockets $29^a$ mounted in recesses 30 of an upper projecting portion 31 of casing 1, the sockets being carried by binding posts 32 slidable in said recesses against the tension of springs 33 which are coiled about said posts. Adjacent the head 27, arm 11 is provided with a circuit wire outlet 34.

The magnets 17 and 18 are energized through the wires 35—36 and battery 37, a switch 38 being interposed in the circuit to selectively energize the magnets. A lamp 39 is disposed within the signal 12, the lamp having circuit wires 40 that extend through the arm 11 and outlet 34 to the binding posts 28. The binding posts 32 have circuit connections 41—42 with the battery 37, the circuit being controlled by a switch 43.

From the foregoing it will be understood that by manipulating switch 38 the magnets 17—18 will be selectively energized and thereby cause the signal 12 to be projected relatively to the housing 7. The core 16 through the heads 25 and the cushioning sockets 23ª, work against air pressure within the chambers of the magnets, so that the said movements of the core are gradual, thereby preventing jars or shocks—such cushioning of the core being effective during all its strokes and being obtained through the employment of the vent openings 22 and 24. The outward movement of the signal arm 11 is arrested near the completion of such movement by contact of the plugs 29 with the yielding sockets 29ª. The illumination of the signal is obtained by manipulating the switch 43 and to make the lamp visible when energized, an opening 44 is formed therein. In this connection it is to be understood that while the signal has been shown provided with the opening 44, such could be omitted if desired and the signal be formed of transparent material.

I claim as my invention:—

A signal apparatus for vehicles comprising a casing, opposed magnets carried by the casing, bearings at adjacent ends of said magnets, a bar slidable in said bearings, armatures at the ends of the bar, an intermediate lateral arm on the bar, springs on the bar between the arm and bearings and movable signal member and an operative connection between the arm and signal member for moving the latter.

In testimony that I claim the foregoing I have hereunto set my hand at Milwaukee, in the county of Milwaukee, and State of Wisconsin, in the presence of two witnesses.

BORNETT L. BOBROFF.

Witnesses:
 GEO. W. YOUNG,
 M. E. DOWNEY.